(12) United States Patent
Byrd

(10) Patent No.: US 8,128,115 B2
(45) Date of Patent: Mar. 6, 2012

(54) GARBAGE CAN CART

(76) Inventor: Jerome Byrd, Westminster, MD (US)

( * ) Notice: Subject to any disclaimer, the term of this patent is extended or adjusted under 35 U.S.C. 154(b) by 0 days.

(21) Appl. No.: 12/870,192

(22) Filed: Aug. 27, 2010

(65) Prior Publication Data

US 2011/0049839 A1 Mar. 3, 2011

Related U.S. Application Data

(60) Provisional application No. 61/275,281, filed on Aug. 27, 2009.

(51) Int. Cl.
*B60D 1/18* (2006.01)
*B60P 9/00* (2006.01)
*B62B 1/00* (2006.01)

(52) U.S. Cl. .......... 280/480; 224/309; 280/40; 280/652; 414/462

(58) Field of Classification Search ................. 224/309, 224/311, 329, 488, 511; 280/40, 63, 402, 280/480, 491.1, 491.3, 497, 498, 639, 640, 280/652; 414/462
See application file for complete search history.

(56) References Cited

U.S. PATENT DOCUMENTS

| | | | | |
|---|---|---|---|---|
| 3,376,986 A * | 4/1968 | Farber | | 414/446 |
| 4,199,452 A | 4/1980 | Mandt | | |
| 4,397,607 A * | 8/1983 | Neill et al. | | 414/812 |
| 5,401,070 A * | 3/1995 | LePelley | | 294/219 |
| 5,704,625 A | 1/1998 | Presnell | | |
| 5,769,449 A * | 6/1998 | Keesee | | 280/656 |
| 5,791,667 A | 8/1998 | Knoll | | |
| 5,860,659 A | 1/1999 | Hart | | |
| 6,164,896 A * | 12/2000 | Cummins | | 414/462 |
| 6,203,032 B1 | 3/2001 | Ramos | | |
| 6,361,264 B1 * | 3/2002 | Guthrie et al. | | 414/462 |
| 7,021,644 B1 * | 4/2006 | Master | | 280/480 |
| 7,101,142 B2 * | 9/2006 | Bik et al. | | 414/462 |
| 7,232,136 B2 | 6/2007 | Sheehan | | |
| 7,614,637 B1 * | 11/2009 | Kidd | | 280/480 |
| 2004/0164517 A1 * | 8/2004 | Lewy et al. | | 280/493 |
| 2004/0232184 A1 * | 11/2004 | Moen et al. | | 224/510 |
| 2005/0023796 A1 * | 2/2005 | Rasmussen | | 280/400 |
| 2006/0291985 A1 * | 12/2006 | Sullivan | | 414/462 |
| 2009/0028679 A1 * | 1/2009 | Smith | | 414/462 |
| 2009/0283987 A1 * | 11/2009 | Long et al. | | 280/498 |

* cited by examiner

*Primary Examiner* — Tony H. Winner
*Assistant Examiner* — Marc Scharich
(74) *Attorney, Agent, or Firm* — Ober, Kaler, Grimes & Shriver; Royal W. Craig

(57) ABSTRACT

A garbage can cart having a rectangular platform base and back, front and side walls in which one or more garbage cans may be placed for storage and transport for disposal. The platform base is supported by a pair of wheels at the rear and a U-bar below the front of the base. A handle bar protrudes upward from the rear wall and curves rearward past the wheels for manually moving the cart. A tow adapter comprising a pair of straps is connected to the rear wall below the handle, the straps extending to distal tow block(s) that may be placed in the trunk of a vehicle and secured therein by closing the trunk. Pulling the tow straps tilts the cart backward about its wheels and lifts the U-bar support from the ground until the handle abuts the tow straps, thereby allowing towing of the cart behind the vehicle.

11 Claims, 4 Drawing Sheets

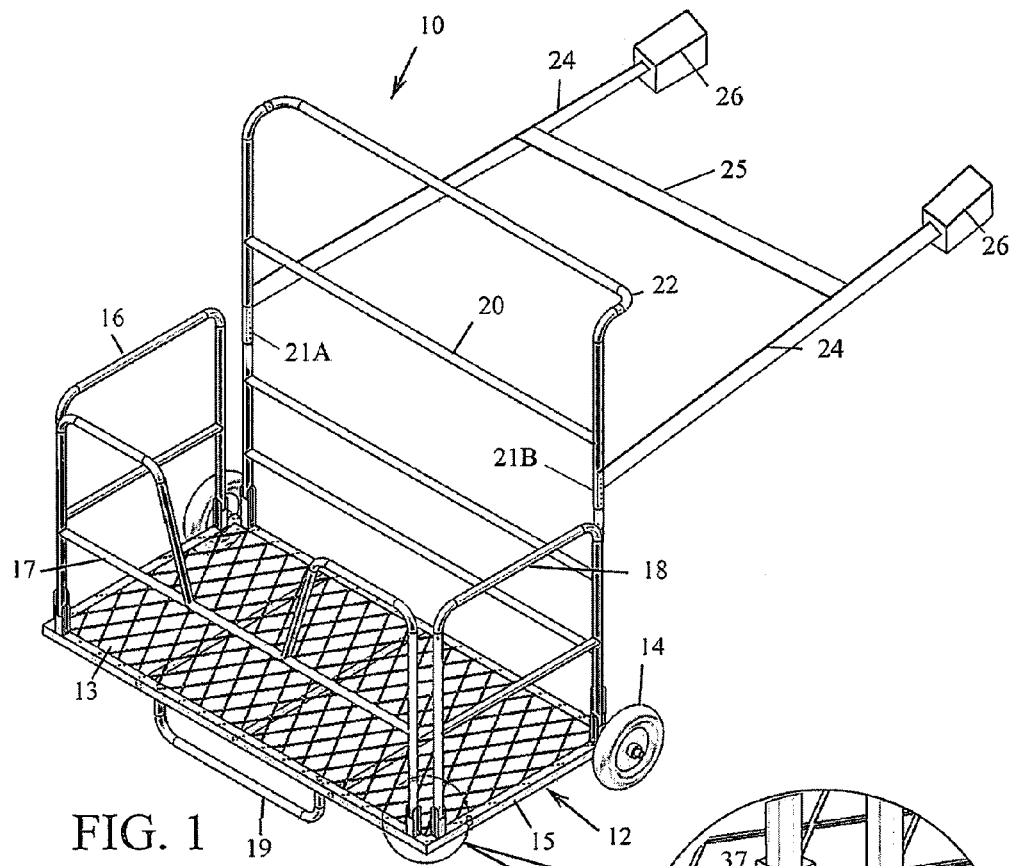
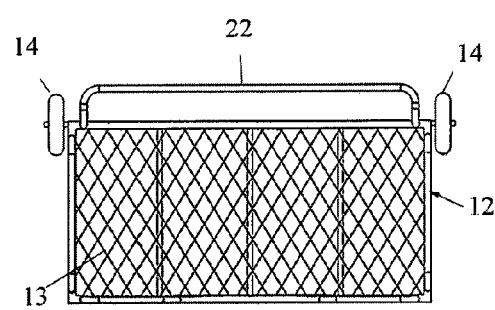
FIG. 2
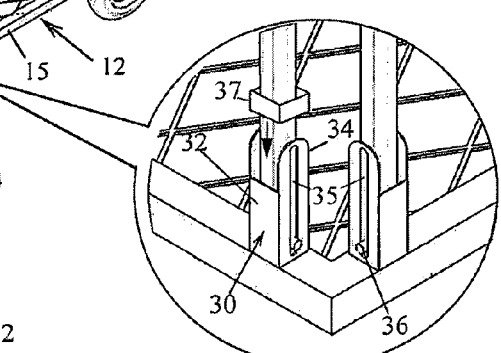
FIG. 1B
FIG. 1

GARBAGE CAN CART

CROSS-REFERENCE TO RELATED APPLICATION(S)

The present application derives priority from U.S. Provisional Application Ser. No. 61/275,281 filed 27 Aug. 2009.

BACKGROUND OF THE INVENTION

1. Field of the Invention

The present invention relates to the transportation of trash containers and more particularly to a trash container carrier that is suitable for transportation of one or more containers either by hand or by attachment behind a vehicle.

2. Description of the Background

Household waste collection and removal is typically provided by municipalities utilizing large, self compacting trucks into which each household's individual garbage can(s) is emptied as the truck travels along its route. In urban settings residents generally are responsible for placing their garbage at the curb or in an alley immediately in front of or behind their residence for pickup. In suburban areas residents typically place their garbage at the curb in front of their home adjacent to their driveway. In rural areas residents also typically place their garbage at the end of their driveway, which, in many cases may be considerably longer than those of suburban homes. In some instances where rural homes share a private road, each resident must transport their garbage to the nearest municipally maintained road for pickup, which may be a substantial distance from their home.

In each area garbage pickup is typically scheduled one or more times a week and may correspond with the pickup of recyclable and yard waste, which must be similarly transported for municipal collection. Custom, convenience, and in many cases, local ordinances require that waste be transported and contained in a garbage can for collection. Such cans come in a variety of forms, commonly cylindrical or rectangular, having a base of approximately two square feet and are typically three to four feet tall with a lid or other closure. Decorum, and again local ordinance often prescribes how soon before a scheduled pickup such cans can be set out and how quickly they must be retrieved after their contents have been collected. Thus, setting out and bringing in the garbage cans has become among the most despised chores of the American home.

A variety of carts have been developed to assist in this regard.

For example, U.S. Pat. No. 7,232,136 describes a cart that is used to drag trash to the curb, but it only meant to be dragged by a person. What's more, the patent requires a cage over the cart to protect the trash from animals, or hide the cans.

U.S. Pat. No. 4,199,161 describes a cart that holds bags not cans and that is meant to stay in place for long periods of time.

U.S. Pat. No. 5,860,659 describes a cart that is used to hold two or more trash cans in a wagon train like configuration. This train is pulled by hand.

U.S. Pat. No. 6,203,032 describes a trash can transportation system for towing multiple trash cans behind a vehicle. However this system requires customized tow equipment and is not meant to also be moved by hand.

U.S. Pat. No. 5,791,667 describes a wheel barrow for transporting circular buckets, but the design only incorporates one wheel and is only meant to be moved by hand.

U.S. Pat. No. 5,704,625 is a device meant to easily transport trash cans. However it only adds a wheel base to the trash container and can only be used with one cart at a time.

The foregoing push carts have limited usefulness, especially to rural residents who may have to transport their garbage a mile or more for collection. This is an arduous task, especially on rainy days.

SUMMARY OF THE INVENTION

It is, therefore, an object of the present invention to provide a quick, easy, lightweight and durable means of transporting and positioning garbage cans for pickup.

It is another object to provide a garbage can cart that is easily moved and positioned by hand, and also adapted to being towed behind any vehicle without the need for specialized towing hitches or other equipment.

It is a further object of the invention to provide a garbage can cart that is sturdy yet collapsible for storage and shipping It is a further object of the invention to provide a garbage can cart that is suitable for towing on rough or uneven terrain.

In accordance with these and other objects of the invention, there is provided a garbage can cart having a tubular frame platform base which is generally of a rectangular shape. The platform base is supported by a pair of wheels at the rear of the base and a U-bar or similar extension below the front of the base. The cart is further defined by three tubular frame walls, namely a first and second side wall and a rear wall, which extend in a generally upward direction from the platform base. In addition, a partial front wall retains cans situated within the cart but allows the user to place cans into or remove them from the cart without need to lift them up and over the full height of the side or rear walls. The rear wall is further adjustably extended up and curved to provide a handle for operation of the cart by an individual. The rear wall is further provided with a horizontal cross bar or other points to which a universal vehicle tow adapter is attached for towing of the cart behind a vehicle. The tow adapter consists of a plurality of flexible straps connected to a tow block that may be affixed to a vehicle for towing and that maintains the cart in a proper position for stable towing in conjunction with the handle of the rear wall.

The foregoing objects, features and attendant benefits of this invention will, in part, be pointed out with particularity and will become more readily appreciated as the same become better understood by reference to the following detailed description of a preferred embodiment and certain modifications thereof when taken in conjunction with the accompanying drawings.

BRIEF DESCRIPTION OF THE DRAWINGS

In the drawings:

FIG. 1 is a perspective view of a cart according to the present invention.

FIG. 1B is a detail view of the base/sidewall connection of an embodiment of the present invention.

FIG. 2 is a top view of a cart according to the present invention.

DETAILED DESCRIPTION OF THE PREFERRED EMBODIMENTS

Figure 4:
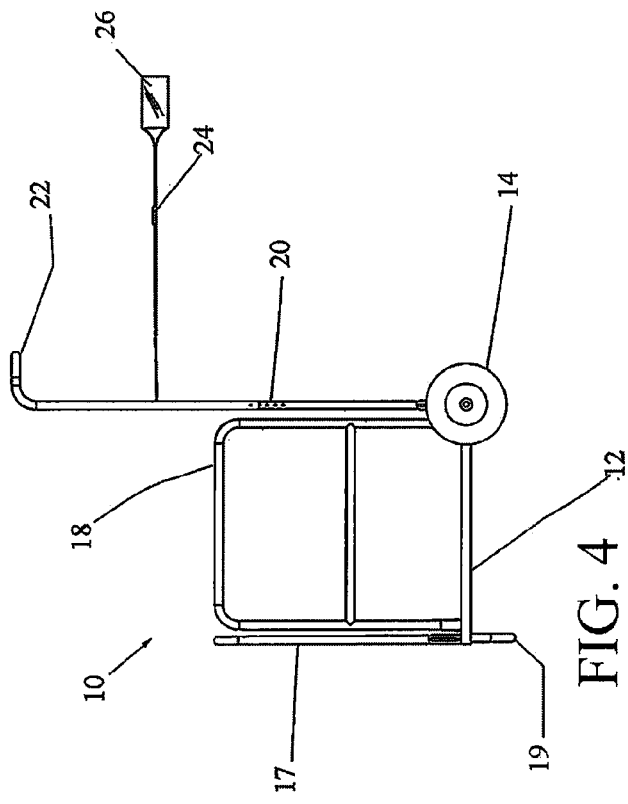
FIG. 4 is a side view of a cart according to the present invention.

The present invention is a garbage can cart having a tubular frame platform base which is generally of a rectangular shape and having back, front and side walls defining a space in which one or more garbage cans may be placed for storage and transport to a location for disposal of their contents. The platform base is supported at rest by a pair of wheels at the rear of the base and a U-bar or similar extension below the front of the base. In motion the cart is rotated backward about its wheels so as to lift the U-bar support from the ground and support all of its weight on its wheels. The cart is further supported and balanced by a handle bar integrally formed at its rear wall and extending rearward past the point of attachment of the wheels. The handle bar may be grasped and supported by an individual moving the cart by hand or may be supported by the straps of the universal tow adapter. The universal tow adapter provides a pair (or more) of adjustable length straps connected to elements of the rear wall below the handle. The straps are connected at their other end to a tow block or blocks that may be placed in the trunk or rear cargo area of a car or SUV and secured there by closing the trunk lid or lift gate in order to tow the cart behind the vehicle.

Corresponding reference characters indicate corresponding parts throughout the several views. Although the drawings represent embodiments of various features and components according to the present invention, the drawings are not necessarily to scale and certain features may be exaggerated in order to better illustrate and explain the present invention. The exemplification set out herein illustrates embodiments of the invention, and such exemplifications are not to be construed as limiting the scope of the invention in any manner.

Figure 3:
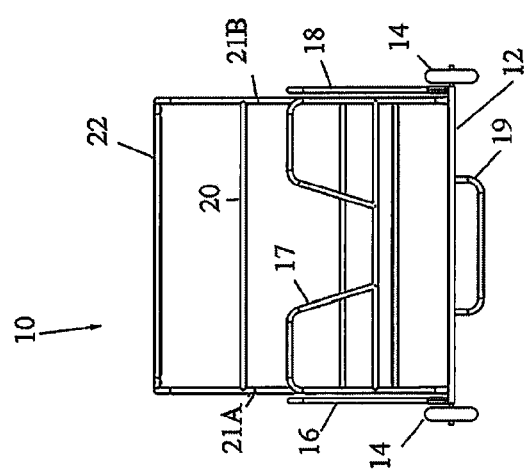
FIG. 3 is front view of a cart according to the present invention.

FIG. 1 shows a perspective view of a cart 10 according to an embodiment of the present invention. FIGS. 2 through 4 show a top, front and side view, respectively of the cart 10. With combined reference to FIGS. 1 through 4, the cart 10 has a base 12 generally rectangular in shape with a length and width sufficient to accommodate the base area of at least two garbage cans. A double-width (i.e. two garbage can width) is preferred in order to increase stability when the cart 10 is towed behind a vehicle, as further described below. The base 12 is constructed of a rigid tubular framework 15 supporting a wire grid 13 that is screwed, riveted or welded thereto. The open wire grid 13 promotes drainage of liquids and prevents the accumulation of waste in the cart itself. The tubular framework 15 may be constructed of metal or plastics including aluminum, polyvinyl chloride (PVC), Acrylonitrile butadiene styrene (ABS), high density polyethylene (HDPE) or any other material of suitable strength, weight and corrosion resistance properties.

The base 12 is supported at its rear corners by wheels 14 rotatably attached to the base 12 and fixedly aligned to allow the unit to roll forward and back. Wheels 14 are of sufficient size to roll on uneven terrain and are preferable approximately 10 inches in diameter. Each wheel 14 is further constructed of pliable material to provide a minimum of shock absorption and traction as the cart is towed and may be pneumatically inflated. A U-bar support 19 is provided at the underside of the front edge of the base 12 to provide a third point of contact when in an upright and stationary position. The U-bar support 19 also prevents the cart 10 from rolling when left upright on unlevel ground.

The area above the base 12 is encircled by a left side wall 16, front wall 17, right side wall 18 and back wall 20. The walls 16, 17, 18 and 20 are similarly constructed of tubular material so as to maintain the overall lightweight character of the cart 10 while containing garbage cans placed on the base 12 and may be releasably joined to an adjacent wall or walls at their intersection to further improve containment and overall cart strength and rigidity. Walls 16, 17 and 18 are of substantially uniform height equal to the width of base 12. The back wall 20 is formed with two telescoping sections 21A, 21B that allow it to be locked (by spring loaded pins) at a user-selectable height ranging to about twice that of the other walls 16, 17 and 18. The front wall 17 preferably has an area of reduced height to ease loading and unloading of garbage cans. All four walls 16, 17, 18, and 20 are attached to the base 12 by knock-down joints 30 as seen in FIG. 1B which is an enlargement of a portion of FIG. 1. Each knock-down joint 30 further comprises a receptacle 32 protruding upward from the base 12 having a central void for receiving the tube-end of one of the walls. The tube-end of each wall carries a transverse pin 36 protruding slightly on both sides. The receptacle 32 has opposing sidewalls 34 flanking the central void on two sides and extending past the upper edge of the void. Both sidewalls are defined by a uniform slot 35 for tongue-in-groove fit with the pin 36. This keeps the tube-end of each wall journaled in the receptacle 32, but free to slide up and out of the void and then pivot about the pin. A collar 37 is provided around each tube-end of each wall which may be slid down over the receptacle 32 to lock the tube-end in a fixed configuration. When this is done at all tube ends it stabilizes all four walls 16, 17, 18, and 20, and yet when the collar 37 is removed all four walls may be collapsed and folded into a compact configuration for storage.

The rear wall 20 is further provided with handle bar 22 at its top for control and positioning of the cart 10 when operated by hand. Handle bar 22 may be of tubular construction similar to the body of the cart 10 and is curved toward and past the rear of the cart 10 so as to provide the user with an ergonomic means for controlling the cart by hand and to position the cart against the car bumper in an optimal position for towing, as described below. The height of the handle bar 20 may be adjusted by sliding the bar up and down in the tubular vertical posts of rear wall 20 and locking the position with spring loaded pins or the like. The rearwardly curved portion of handle bar 22 inclines downward when the cart 10 is tilted solely onto its wheels and provides a hand grip around which to facilitate manual maneuvering of the cart 10. The height of the handlebar 20 may be adjusted for comfort during manual operation but, importantly, is also adjusted to maintain proper balance and orientation relative to the tow vehicle, as described below. The handle 22 may be covered with a resilient (e.g., foam rubber) material to provide a comfortable hand grip surface as well as to provide a non-slip, non-marring surface during towing.

For rural residents who may have to transport their garbage a mile or more for collection, a unique towing mechanism is provided to allow attachment to most any car. Two (or more) tow straps 24 of adjustable length are provided connecting the rear wall 20 to one or more tow blocks 26. The tow straps 24 are preferably constructed of woven or non-woven flexible fabric strips, and more preferably of light and strong polypropylene, cotton, nylon or polyester webbing although round cord may be utilized in some embodiments. The tow blocks 26 are rigid, lightweight members having a cross section enlarged from that of the tow straps 24 and preferably rounded or rectangular as shown. A single, elongate tow block 26 my be provided that engages both tow straps 24 or individual tow blocks 26 may be provided for each tow strap 24 as depicted in FIG. 1. Where individual tow blocks 26 are utilized a cross strap or strut 25 may also be provided to maintain a uniform distance between the two straps 24 although this is unnecessary where friction from the closed trunk lid or lift gate is sufficient to maintaining the tow strap spacing. The tow straps 24 may engage the tow block 26 by encircling it to form a secure loop or by mechanical means such as a clip, screw, hook and loop or other fastener.

As seen in FIG. 4, the straps 24 are secured to the rear wall at a point positioned above the center of mass of the loaded cart. If the point of attachment of the tow straps 24 is too low (i.e. below the center of mass) the cart will tend to slide rather than pivot about its wheel into the desired tow position when pulled by the straps. The strap engagement to the rear wall 20 is adjustable so as to permit the height to be adjusted to accommodate the variable mass and weight distribution of garbage as well as variable tow vehicle geometries, as described below.

Figure 5:
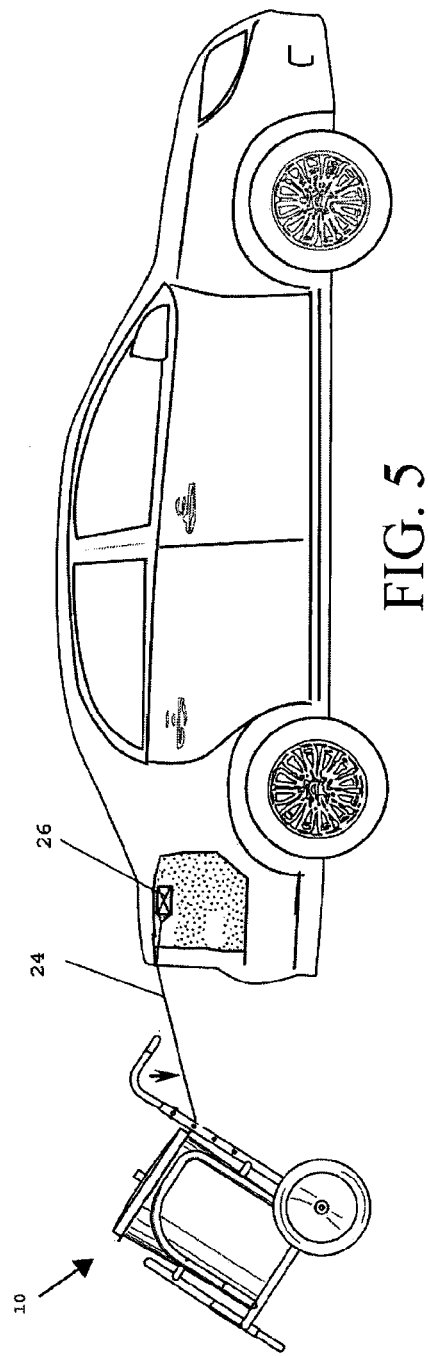
FIG. 5 is a schematic view of a cart according to the present invention being towed by a vehicle.

With reference to FIG. 5, when it is desired to tow the cart 10 behind a vehicle the cart is positioned behind the vehicle and the top-hinged trunk lid or lift gate of the vehicle cargo area is opened. The tow block or blocks 26 are then placed in the trunk of the vehicle and the trunk lid is closed retaining the tow block 26 but allowing the tow straps 24 to exit the trunk and connect to the cart. As the car begins to pull forward the tow straps pull the cart 10 off balance, causing it to rotate and tip rearward about the axis of its wheels 14 (towards the car bumper) lifting the U-bar support 19 off the ground so that the weight of the cans in the cart 10 is supported on the wheels 14. As the cart 10 tips further towards the car bumper, the curved end of handle bar 22 engages the tow straps 24 stopping the tipping/rotation and maintaining the cart in a tipped but upright position on its wheels 14 for towing. The weight of the garbage cans draws the handle bar 22 down and toward the bumper of the vehicle, lodged against the tow straps 24.

The length of tow straps 24 may be adjusted to accommodate vehicles of varying height and bumper design but should be adjusted so as to be equal in length. In concert with the tow strap length, the height of the handlebar 22 should be adjusted so as to maintain the curved distal portion of the handle even with a rear surface, preferably a bumper, of the vehicle during towing to facilitate light braking of the vehicle without the cart impacting the vehicle and causing damage. Increasing the strap length tends to increase the rotation of the cart 10 about its wheels 14 (the amount of forward tip). The strap 24 length is preferably long enough for the cart to tip past its balance point (where the center of mass is at or past the wheels) but not so far as to drag or lose its lid. The strap 24 length preferably favors over rotation toward the vehicle as the center of mass of the garbage will vary from load to load and it is preferable for the cart 10 to remain tipped when the vehicle slows or stops during towing. Increasing the strap 24 length may result in the cart being to far from the vehicle to maintain contact. This is corrected by raising the handle 22 height to re-engage the bumper of the tow vehicle. Increasing the handle 22 height however, tends to counter the rotational effect of increasing the strap 24 length. An optimal combination of strap 24 length and handle 22 height can be determined and fixed for the particular geometry of any vehicle based on these principals.

When the cart 10 is not being towed, towing block 26 hangs vertically by towing straps 24 against rear wall 20 so as to be out of the way and inconspicuous. Front wall 17 of cart 10 may, in some embodiments of the present inventions, be provided with means of securing the tow bar of a like cart so as to permit the towing of more than one such cart behind a vehicle at the same time. It should be observed that the cart 10 of the present invention, while sturdy and capable of being towed over rough terrain such as dirt or gravel driveways, is not intended for use at high speeds or on public roads and is not intended for registration with a state motor vehicle authority.

Figure 6:
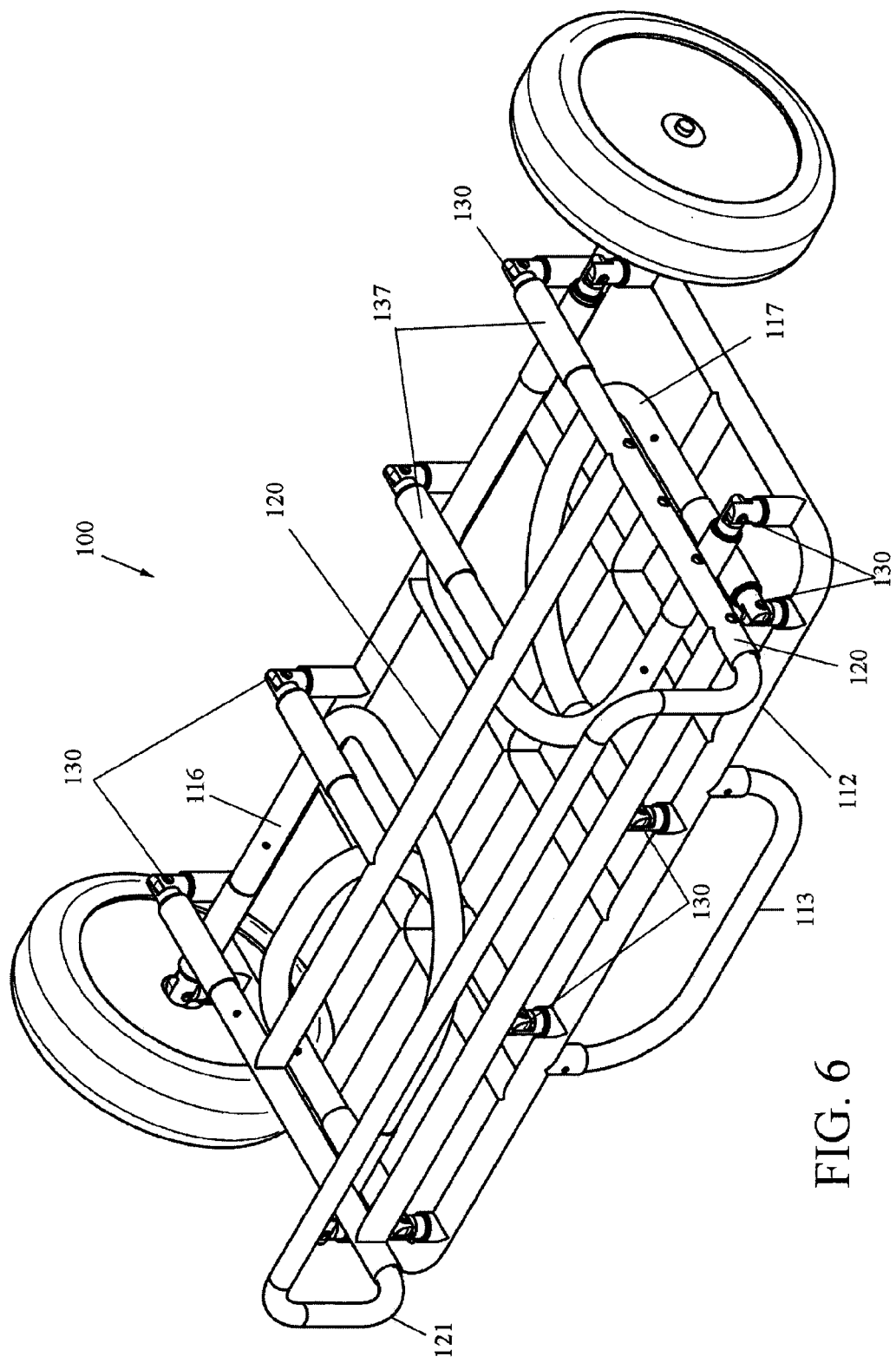
FIG. 6 is a perspective view of an alternate embodiment of a cart 100 similar in form and identical in function to the cart 10 of FIGS. 1-5.
Figure 7:
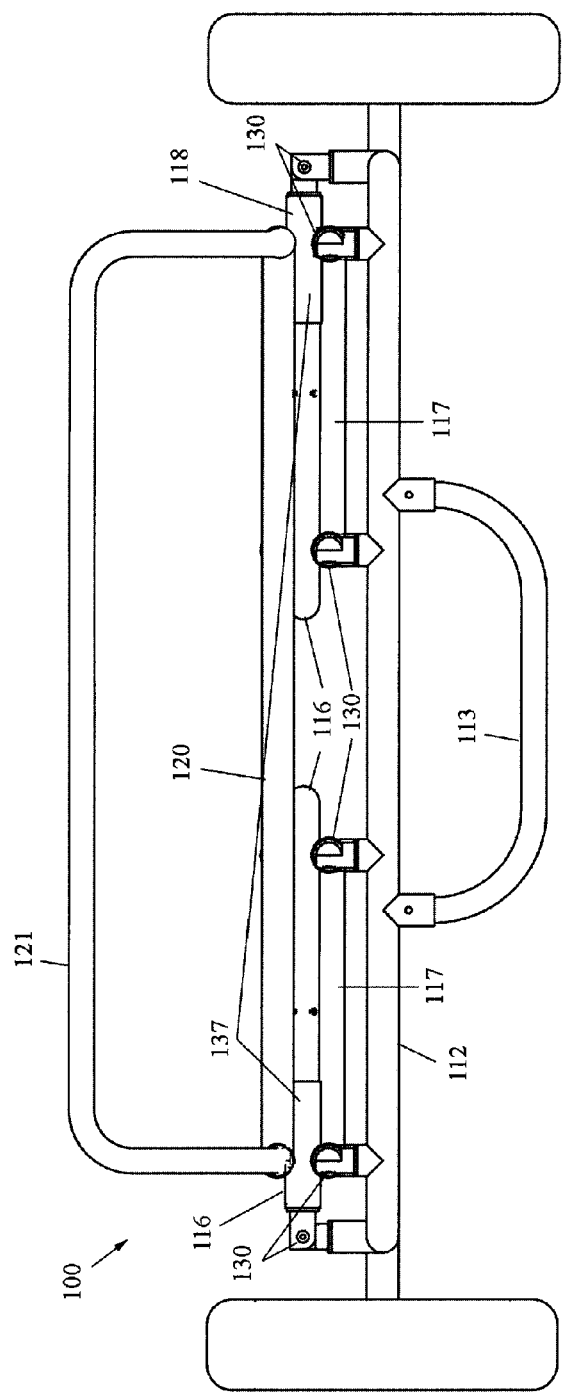
FIG. 7 is a front view of cart 100 of FIG. 6.
Figure 8:
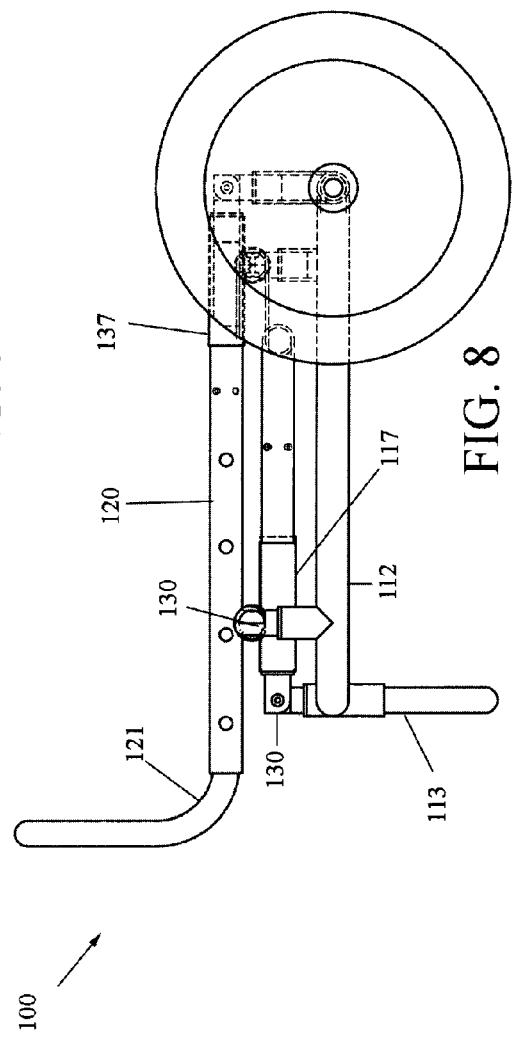
FIG. 8 is a side view of cart 100 of FIGS. 6-7.

FIGS. 6-8 illustrate an alternate embodiment of the cart 100 similar in form and identical in function to the cart 10 of FIGS. 1-5, but made entirely of a tubular framework without wire grid base. The base 112 is generally rectangular in shape with a length and width sufficient to accommodate the base area of at least two garbage cans. The base 112 is constructed entirely of a rigid tubular framework with tube sections that are screwed, riveted or welded into a lattice configuration for supporting the two garbage cans. A downwardly-disposed U-shaped floor brace 113 extends downward to prevent inadvertent forward tipping. The open lattice configuration promotes drainage of liquids and prevents the accumulation of waste in the cart itself. The tubular framework may be constructed of metal or plastics as set forth above.

The area above the base 112 is encircled by a left side wall 116, front wall 117, right side wall 118 and back wall 120, at shown in a folded/layered configuration in FIGS. 6-8. The walls 116, 117, 118 and 120 are similarly constructed of tubular material so as to maintain the overall lightweight character of the cart 100 while containing garbage cans placed on the base 112. Walls 116, 117 and 118 are of substantially uniform height approximately equal to the width of base 112. The left side wall 116 and right side wall 118 are substantially U-shaped sections each terminating at two downwardly-disposed tube-ends which are pivotally-connected to the base 112. The front wall 117 likewise comprises two substantially U-shaped sections each terminating at two downwardly-disposed tube-ends which are pivotally-connected to the base 112 at corresponding upwardly-disposed tube-ends, the corresponding tube ends being pivotally connected. The front wall 117 preferably has a middle area of reduced height to ease loading and unloading of garbage cans. In this regard, the front wall 117 may comprise two independently-pivoting U-shaped sections as illustrated, or just one section (e.g., by connecting the two independently-pivoting U-shaped sections via cross-tube. Back wall 120 comprises four equally-spaced vertical tubes joined mid-height by a cross-beam, the vertical tubes terminating at four downwardly-disposed tube-ends which are pivotally-connected to upwardly-disposed tube-ends on the base 112. The outermost two tubes of back wall 120 are longer than the central tubes, and rise open-ended for insertion of a telescoping section 121 that can be locked (by spring loaded pins) at a user-selectable height ranging to about twice that of the other walls 116, 117 and 118. All four walls 116, 117, 118, and 120 are attached to the base 112 by pivot joints 130 similar to the knock-down joints 30 of FIG. 1B, though in this case fitted into the tube ends. A collar 137 is provided around each tube-end of each wall 116, 117, 118 and 120 which may be slid down over the pivot joints 130 to lock the tube-ends in a fixed vertical configuration. When this is done at all tube ends it stabilizes all four walls 116, 117, 118, and 120, and yet when the collar 137 is removed all four walls may be collapsed and folded into the illustrated compact-layered configuration for storage. One skilled in the art should understand that self-locking pivot joints may be employed in place of collars 137.

It should be understood that the invention may be used with a variety of garbage can designs and sizes and may be constructed of a variety of materials. This application is therefore intended to cover any variations, uses, or adaptations of the invention using its general principles. Further, this application is intended to cover such departures from the present disclosure as come within known or customary practice in the art to which this invention pertains.

I claim:

1. A garbage can cart for towing behind a vehicle having a trunk space coverable by a hinged closure, comprising:
    a rectangular platform base for supporting one or more refuse containers;
    a first sidewall, a second sidewall and a rear wall engaging a perimeter of said platform base and extending generally upward there from, said rear wall having a height greater than a height of said first and second sidewalls;
    a pair of wheels rotatably secured adjacent to rear corners of said platform base;
    a handlebar engaged to an upper end of said rear wall, a distal portion of said handlebar extending rearward of said pair of wheels; and
    a tow adapter, said tow adapter comprising
        a plurality of tow straps each having a proximal end engaged to said rear wall, substantially below said handlebar, and a distal end, said distal end engaged to at least one tow block retained in said vehicle trunk space by said hinged closure to allow said cart to be towed behind said vehicle.

2. The garbage can cart of claim 1, wherein said first sidewall, said second sidewall and said rear wall each further comprise a tubular frame.

3. The garbage can cart of claim 2, wherein said tubular frame is constructed of a metal.

4. The garbage can cart of claim 3, wherein said tubular frame metal is selected from the group consisting of aluminum and steel.

5. The garbage can cart of claim 2, wherein said tubular frame is constructed of a polymer.

6. The garbage can cart of claim 5, wherein said polymer is selected from the groups consisting of polyvinyl chloride (PVC), Acrylonitrile butadiene styrene (ABS) and high density polyethylene (HDPE).

7. The garbage can cart of claim 2, wherein an engagement of said tubular frames of said first sidewall, said second sidewall and said rear wall, with said platform base, each further comprise
    at least one vertical tubular member;
    a transverse pin radiating from opposing sides of an end of each of said at least one vertical tubular member; and
    a cooperative receptacle affixed to said platform base, said receptacle comprising
        a void for receiving said end of said at least one vertical tubular member; and
        two opposing sidewalls flanking said void, said opposing sidewalls each defining a slot extending past an upper edge of said void, said transverse pin being received in said slots of said opposing sidewalls, wherein said pin slides in said slots when said end of said at least one vertical tubular member is lifted from said void and wherein said pin rotates in said slot when said lifted at least one vertical tubular member is folded against said platform base for storage.

8. The garbage can cart of claim 1, further comprising a front wall, said front wall having an area having a height lower than a height of a remainder of said front wall.

9. The garbage can cart of claim 1, wherein said plurality of tow straps are adjustable in length.

10. The garbage can cart of claim 1, further comprising a support member secured to an underside of said platform base adjacent to a front edge of said platform base.

11. The garbage can cart of claim 10, wherein said support member is a U-bar support.

* * * * *